United States Patent [19]
Ohta et al.

[11] Patent Number: 5,835,617
[45] Date of Patent: Nov. 10, 1998

[54] OPTICAL COMPUTER TOMOGRAPHIC APPARATUS AND IMAGE RECONSTRUCTION METHOD USING OPTICAL COMPUTER TOMOGRAPHY

[75] Inventors: Kazuyoshi Ohta; Yukio Ueda, both of Hamamatsu, Japan

[73] Assignee: Hamamatsu Photonics K.K., Hamamatsu, Japan

[21] Appl. No.: 785,225

[22] Filed: Jan. 17, 1997

[30] Foreign Application Priority Data

Jan. 18, 1996 [JP] Japan .................................. 8-006619

[51] Int. Cl.⁶ .............................. G06K 9/00; A61B 6/00
[52] U.S. Cl. ......................... 382/131; 382/128; 378/901; 378/4
[58] Field of Search ..................... 382/131, 128, 382/130, 154, 282, 284; 378/901, 4, 21, 74, 86, 87, 89; 364/751, 736.01, 468.25; 356/379, 377, 325

[56] References Cited

U.S. PATENT DOCUMENTS

| | | | |
|---|---|---|---|
| 4,375,695 | 3/1983 | Harding et al. | 378/6 |
| 4,672,651 | 6/1987 | Horiba et al. | 378/9 |
| 5,070,455 | 12/1991 | Singer et al. | 364/413.14 |
| 5,137,355 | 8/1992 | Barbour et al. | 356/342 |

FOREIGN PATENT DOCUMENTS

| | | | |
|---|---|---|---|
| 0 561 643 | 9/1993 | European Pat. Off. | 378/4 |
| 0 614 645 | 9/1994 | European Pat. Off. | 378/4 |

OTHER PUBLICATIONS

Pogue et al, "Forward and Inverse Calculations for 3–D Frequency–Domain Diffuse Optical Tomography", SPIE, vol. 2389, pp. 328–339.

Schotland et al, "Photon Hitting Density", Applied Optics, vol. 32, No. 4, Feb. 1, 1993, pp. 448–453.

Dolne et al, "Analysis of Time–Resolved Data for Tomographical Image Reconstruction of Opague Phantoms and Finite Absorbers in Diffusive Media", SPIE, vol. 2389, pp. 16–29.

Primary Examiner—Jose L. Couso
Assistant Examiner—Duy M. Dang
Attorney, Agent, or Firm—Pillsbury Madison & Sutro LLP

[57] ABSTRACT

An arithmetic control mechanism of the present optical CT apparatus calculates first light densities in output portions of an object on the basis of a numerical analysis method, when it is assumed that the object is divided into fine segments and all segments have the same value as an absorption coefficient under predetermined conditions equivalent to an actual measurements; and calculates second light densities in the output portions on the basis of the method, when it is assumed that sequentially selected one of the segments has a specific value as an absorption coefficient under the predetermined conditions. Further, the mechanism calculates, as influences of the segments, ratios of the first to the second light densities, thereby obtaining an influence matrix corresponding to an arrangement of the segments; calculates relative ratios of the third light densities in the output portions on the basis of the actual measurements to the fitst light densities, thereby obtaining a relative ratio matrix corresponding to arrangements of input and output portions of the object; and performs a matrix calculation by using the influence matrix and the relative ratio matrix, thereby obtaining feature data of the segments for reconstructing a tomographic image of the object.

24 Claims, 14 Drawing Sheets

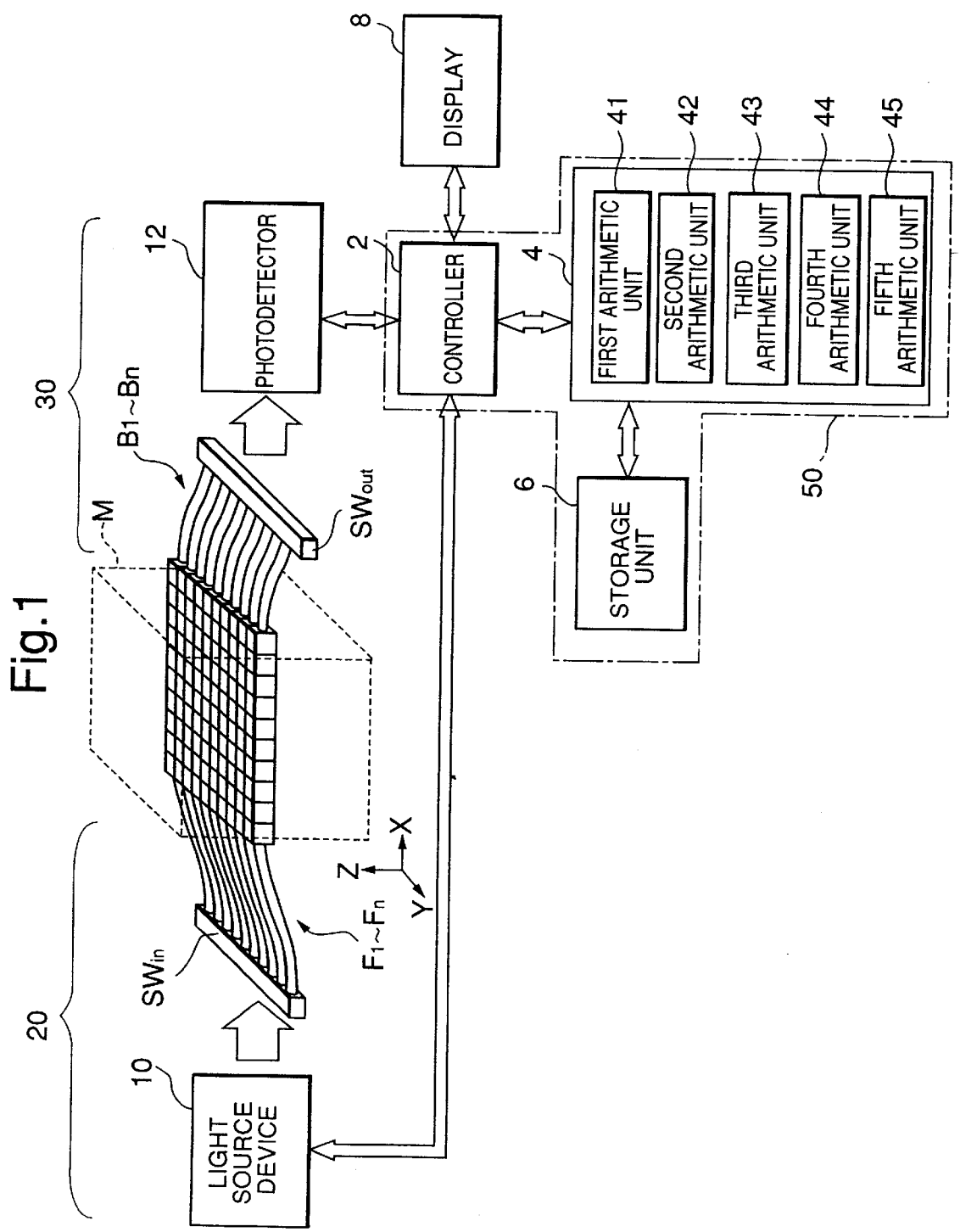

OPTICAL COMPUTER TOMOGRAPHIC APPARATUS AND IMAGE RECONSTRUCTION METHOD USING OPTICAL COMPUTER TOMOGRAPHY

BACKGROUND OF THE INVENTION

1. Field of the Invention

The present invention relates to an optical computer tomographic (CT) apparatus for projecting light onto an object to be examined, e.g., a living body such as a human body, an animal, or a plant, and reconstructing a tomographic image of the object on the basis of the measurement value of the light transmitted through the object, and an image reconstruction method using optical computer tomography (CT).

2. Related Background Art

A conventional optical CT apparatus projects light from a light source onto an object to be examined such as a living body and measures the light transmitted through the interior of the object by using a detector. As an algorithm for reconstructing a tomographic image on the basis of the measurement result, an algorithm which calculates the passing frequency (the spatial distribution of an average optical path length) when light (a light beam) passes through a specific region in a living body on the basis of Monte Carlo simulation is used.

That is, according to this algorithm, a model by which an object to be examined is segmented into a plurality of volume elements (VOXEL) is assumed, and the number of collisions of a light beam or the average optical path length (the total sum or the average value of the distances the light beam travels across the volume elements) of the light beam is calculated for each volume element. In this manner, feature extraction is performed for each of the volume elements required for image reconstruction.

SUMMARY OF THE INVENTION

It is an object of the present invention to provide an optical computer tomographic apparatus capable of rapidly reconstructing a tomographic image of an object to be examined with a high quality. It is another object of the present invention to provide an image reconstruction method using optical computer tomography which can rapidly reconstruct a tomographic image of an object to be examined with a high quality.

To achieve the above objects, an optical computer tomographic (CT) apparatus of the present invention comprises (1) a light-projecting unit for individually exclusively projecting measurement light onto a plurality of different first portions of an object to be examined, (2) a light-receiving unit for individually exclusively receiving the measurement light emitted from the light-projecting unit and transmitted through the object in a plurality of different second portions of the object, and (3) an arithmetic control mechanism for controlling operations of the light-projecting unit and the light-receiving unit, thereby reconstructing a tomographic image of the object on the basis of a scattering absorption state of the measurement light entering the object. The arithmetic control mechanism comprises (i) a first arithmetic unit for calculating light densities of the measurement light obtained in the plurality of second portions on the basis of a numerical analysis method which approximates a predetermined light diffusion equation, when it is assumed that the object is divided into a plurality of fine segments as an aggregate model and all the plurality of segments have the same value as an absorption coefficient under conditions equivalent to the conditions by which the object is measured by using the light-projecting unit and the light-receiving unit, (ii) a second arithmetic unit for calculating light densities of the measurement light obtained in the plurality of second portions on the basis of the numerical analysis method, when it is assumed that only one segment sequentially selected from the plurality of segments has a specific value as an absorption coefficient under the conditions equivalent to the conditions by which the object is measured by using the light-projecting unit and the light-receiving unit, (iii) a third arithmetic unit for calculating, as influences of the plurality of segments, ratios of the light densities of the plurality of second portions calculated by the first arithmetic unit to the light densities of the plurality of second portions calculated by the second arithmetic unit, thereby obtaining an influence matrix corresponding to an arrangement of the plurality of segments, (iv) a fourth arithmetic unit for calculating relative ratios of the light densities of the measurement light obtained in the plurality of second portions on the basis of the actual measurements done by using the light-projecting unit and the light-receiving unit to the light densities in the plurality of second portions calculated by the first arithmetic unit, thereby obtaining a relative ratio matrix corresponding to arrangements of the pluralities of first and second portions, and (v) a fifth arithmetic unit for performing a matrix calculation by using the influence matrix obtained by the third arithmetic unit and the relative ratio matrix obtained by the fourth arithmetic unit, thereby obtaining feature data of the plurality of segments.

In the optical CT apparatus of the present invention, it is preferable that the numerical analysis method be a difference method which solves the light diffusion equation by approximating the equation to a difference equation, and the segments be volume elements arranged at equal intervals in the object on the basis of a predetermined coordinate system.

In the optical CT apparatus of the present invention, it is preferable that the numerical analysis method be a finite element method which solves the light diffusion equation by approximating the equation to a finite element equation, and the segments be finite elements which are a finite number of elements freely separately arranged in the object.

In the optical CT apparatus of the present invention, it is preferable that the numerical analysis method be a finite volume method which solves the light diffusion equation by approximating the equation to a finite volume equation, and the segments be finite volumes which are a finite number of volumes freely separately arranged in the object.

In the optical CT apparatus of the present invention, it is preferable that when it is assumed that each of the absorption coefficients of the plurality of segments is zero, the first arithmetic unit calculate the light densities of the plurality of segments on the basis of the numerical analysis method.

In the optical CT apparatus of the present invention, it is preferable that the fifth arithmetic unit obtain a distribution of absorption coefficients in the object as the feature data of the plurality of segments.

In the optical CT apparatus of the present invention, it is preferable that the light-projecting unit emit continuous light as the measurement light to be projected onto the object, and the light-receiving unit continuously detect the exit measurement light from the object.

In the optical CT apparatus of the present invention, it is preferable that the light-projecting unit emit pulse light as the measurement light to be projected onto the object, and the light-receiving unit detect the exit measurement light from the object by a predetermined time-resolved measurement.

In the optical CT apparatus of the present invention, it is preferable that the light-projecting unit comprise a light source for generating the measurement light, a plurality of optical fibers for projecting the measurement light emitted from the light source onto the object, and an optical switch which connects the light source and the plurality of optical fibers by using light branch paths and selectively opens only one of a plurality of output terminals constituting the light branch paths.

In the optical CT apparatus of the present invention, it is preferable that the light-receiving unit comprise a plurality of optical fibers for extracting the measurement light from the object, a photoelectric conversion device for photoelectrically converting the incident measurement light from the plurality of optical fibers, and an optical switch which connects the plurality of optical fibers and the photoelectric conversion device by using light branch paths and selectively opens only one of a plurality of input terminals constituting the light branch paths.

In the optical CT apparatus of the present invention, it is preferable that the arithmetic control mechanism further comprise a storage unit for storing various data detected by the light-receiving unit and various data calculated by the first to fifth arithmetic units, and a controller for sequentially controlling operations of the light-projecting unit, the light-receiving unit, and the first to fifth arithmetic units.

The optical CT apparatus of the present invention preferably further comprises a display for processing input image data from the arithmetic control mechanism and displaying a tomographic image of the object.

To achieve the above objects, an image reconstruction method using optical computer tomography (CT) according to the present invention comprises (i) the first step of controlling operations of a light-projecting unit and a light-receiving unit by using an arithmetic control mechanism, thereby causing the light-projecting unit to individually exclusively project measurement light onto a plurality of different first portions of an object to be examined and the light-receiving unit to individually exclusively receive the measurement light emitted from the light-projecting unit and transmitted through the object in a plurality of different second portions of the object, (ii) the second step of causing the arithmetic control mechanism to calculate light densities of the measurement light obtained in the plurality of second portions on the basis of a numerical analysis method which approximates a predetermined light diffusion equation, when it is assumed that the object is divided into a plurality of fine segments as an aggregate model and all the plurality of segments have the same value as an absorption coefficient under conditions equivalent to the conditions by which the object is measured by using the light-projecting unit and the light-receiving unit, (iii) the third step of causing the arithmetic control mechanism to calculate light densities of the measurement light obtained in the plurality of second portions on the basis of the numerical analysis method, when it is assumed that only one segment sequentially selected from the plurality of segments has a specific value as an absorption coefficient under the conditions equivalent to the conditions by which the object is measured by using the light-projecting unit and the light-receiving unit, (iv) the fourth step of causing the arithmetic control mechanism to calculate, as influences of the plurality of segments, ratios of the light densities of the second portions calculated in the second step to the light densities of the plurality of second portions calculated in the third step, thereby obtaining an influence matrix corresponding to an arrangement of the plurality of segments, (v) the fifth step of causing said arithmetic control mechanism to calculate relative ratios of the light densities of the measurement light obtained in the plurality of second portions in the first step to the light densities in the plurality of second portions calculated in the second step, thereby obtaining a relative ratio matrix corresponding to arrangements of the pluralities of first and second portions, and (vi) the sixth step of causing said arithmetic control mechanism to perform a matrix calculation by using the influence matrix obtained in the fourth step and the relative ratio matrix obtained in the fifth step, thereby obtaining feature data of the plurality of segments in order to reconstruct a tomographic image of the object on the basis of a scattering absorption state of the measurement light entering the object.

In the image reconstruction method using optical tomography according to the present invention, it is preferable that the second to sixth steps comprise using as the numerical analysis method a difference method which solves the light diffusion equation by approximating the equation to a difference equation, and using as the segments volume elements arranged at equal intervals in the object on the basis of a predetermined coordinate system.

In the image reconstruction method using optical CT according to the present invention, it is preferable that the second to sixth steps comprise using as the numerical analysis method a finite element method which solves the light diffusion equation by approximating the equation to a finite element equation, and using as the segments finite elements which are a finite number of elements freely separately arranged in the object.

In the image reconstruction method using optical CT according to the present invention, it is preferable that the second to sixth steps comprise using as the numerical analysis method a finite volume method which solves the light diffusion equation by approximating the equation to a finite volume equation, and using as the segments finite volumes which are a finite number of volumes freely separately arranged in the object.

In the image reconstruction method using optical CT according to the present invention, it is preferable that when it is assumed that each of the absorption coefficients of the plurality of segments is zero, the second step comprise calculating the light densities of the plurality of segments on the basis of the numerical analysis method.

In the image reconstruction method using optical CT according to the present invention, it is preferable that the sixth step comprise obtaining a distribution of absorption coefficients in the object as the feature data of the plurality of segments.

In the image reconstruction method using optical CT according to the present invention, it is preferable that the first step comprise causing the light-projecting unit to emit continuous light as the measurement light to be projected onto the object, and causing the light-receiving unit to continuously detect the exit measurement light from the object.

In the image reconstruction method using optical CT according to the present invention, it is preferable that the first step comprise causing the light-projecting unit to emit pulse light as the measurement light to be projected onto the object, and causing the light-receiving unit to detect the exit measurement light from the object by a predetermined time-resolved measurement.

In the image reconstruction method using optical CT according to the present invention, it is preferable that the first step comprise causing a light source included in the light-projecting unit to generate the measurement light, causing a plurality of optical fibers included in the light-projecting unit to project the measurement light emitted from the light source onto the object, and causing an optical switch which is included in the light-projecting unit and connects the light source and the plurality of optical fibers by using light branch paths to selectively open only one of a plurality of output terminals constituting the light branch paths.

In the image reconstruction method using optical CT according to the present invention, it is preferable that the first step comprise causing a plurality of optical fibers included in the light-receiving unit to extract the measurement light from the object, causing a photoelectric conversion device included in the light-receiving unit to photoelectrically convert the incident measurement light from the plurality of optical fibers, and causing an optical switch which is included in the light-receiving unit and connects the plurality of optical fibers and the photoelectric conversion device by using light branch paths to selectively open only one of a plurality of input terminals constituting the light branch paths.

In the image reconstruction method using optical CT according to the present invention, it is preferable that the first to sixth steps comprise causing a storage unit included in the arithmetic control mechanism to store various data detected by the light-receiving unit and various data calculated by an arithmetic unit included in said arithmetic control mechanism, and causing a controller included in the arithmetic control mechanism to sequentially control operations of the light-projecting unit, the light-receiving unit, and the arithmetic unit.

The image reconstruction method using optical CT according to the present invention preferably further comprises the seventh step of causing a diplay to process input image data from the arithmetic control mechanism and to display a tomographic image of the object.

The optical CT apparatus and the image reconstruction method using optical CT as described above do not perform calculations for all possible light beams when there is a light beam which does not reach a detector in actual measurements, unlike a conventional light beam tracking method such as Monte Carlo simulation in which scattering events of light beams caused by scattering particles are calculated by using random numbers.

Since no calculation is performed for unnecessary information (event), the time required for arithmetic operations is shortened compared to the conventionally required time. This decreases the number of objects to be calculated compared to the number required in the conventional method, even when a high-quality tomographic image is to be reconstructed. Consequently, a tomographic image of an object to be examined can be rapidly reconstructed with a high quality.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1 includes a perspective view and a block diagram showing the arrangement of an optical CT apparatus according to the first embodiment of the present invention;

DESCRIPTION OF THE PREFERRED EMBODIMENTS

Figure 2A:
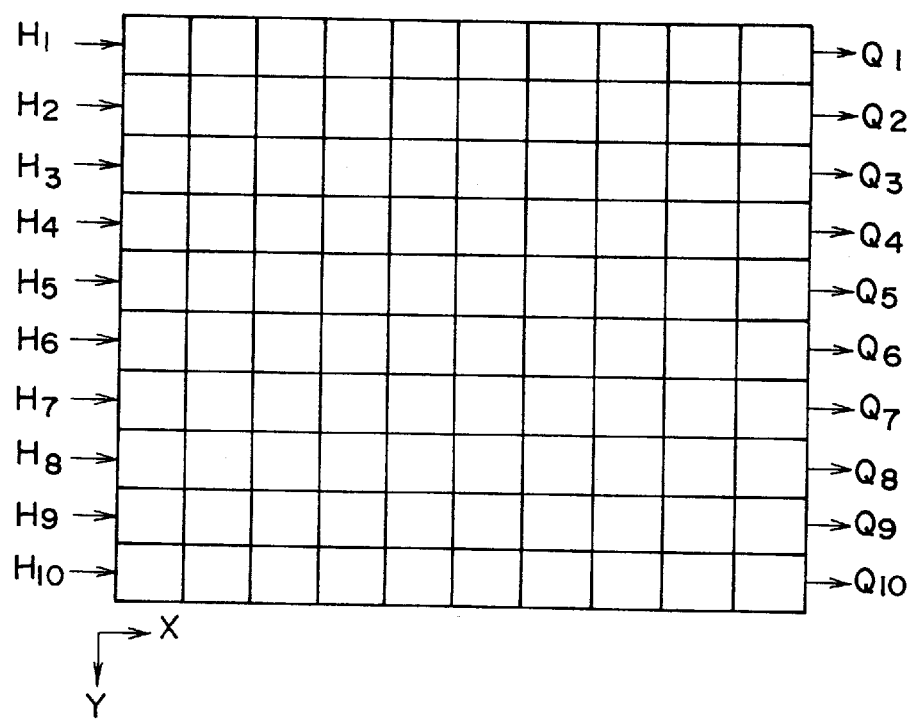
FIG. 2A is a sectional view showing segmentation in a slice of an object to be examined in order to explain the principle of image reconstruction by the optical CT apparatus shown in FIG. 1.
Figure 2B:
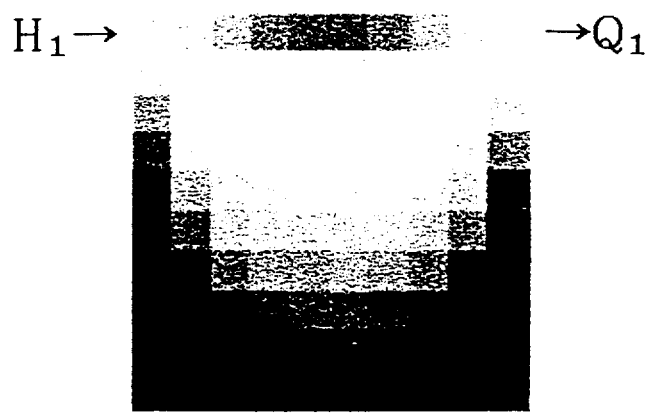
FIGS. 2B to 2K are halftone images each indicated by displaying on a display the influences of a plurality of segments obtained by applying simulation based on a difference method to the slice shown in FIG. 2A.
Figure 2C:
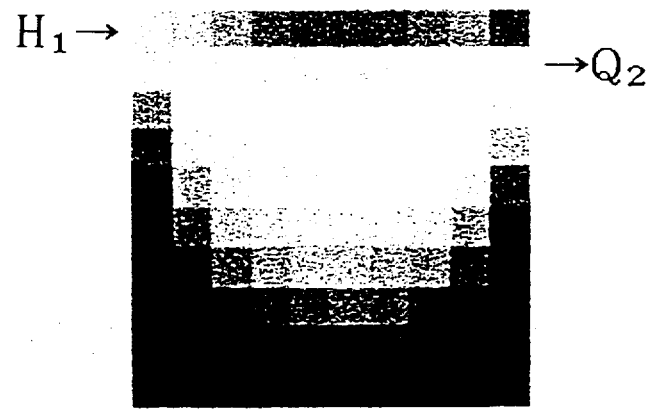
Figure 2D:
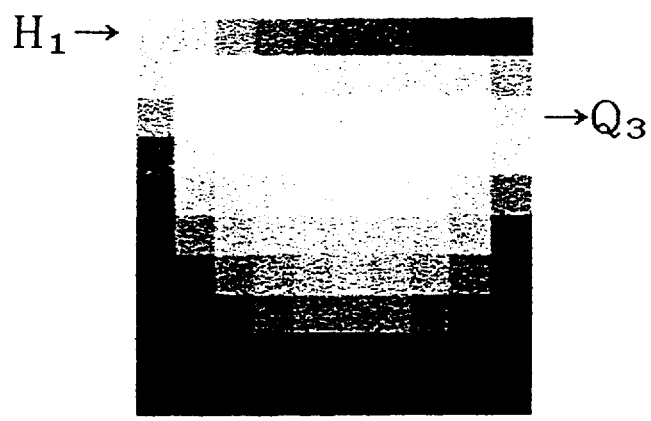
Figure 2E:
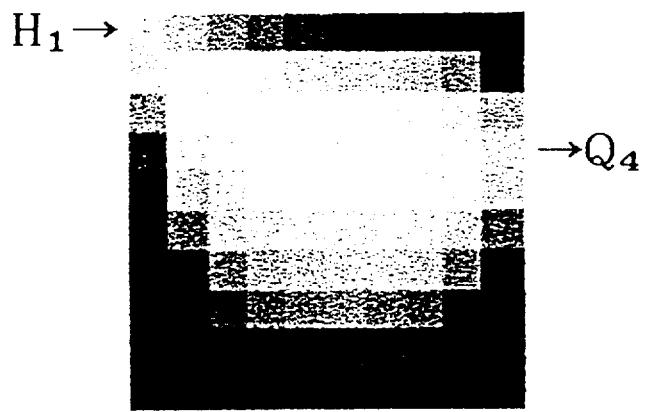
Figure 2F:
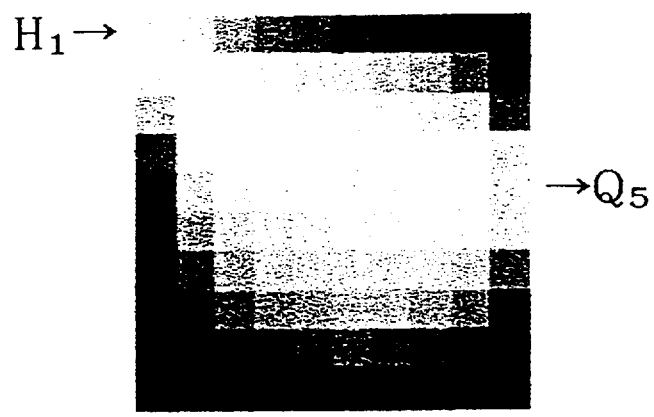
Figure 2G:
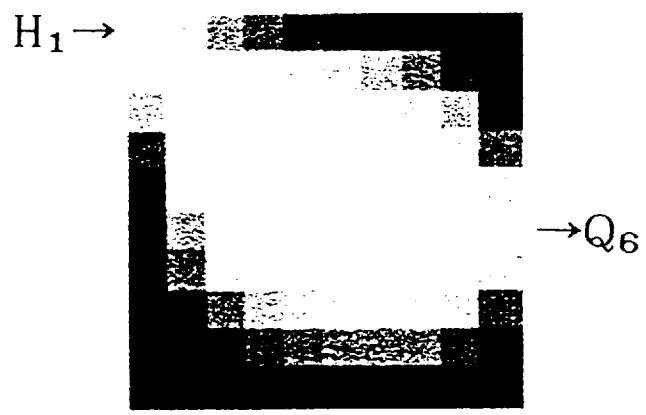
Figure 2H:
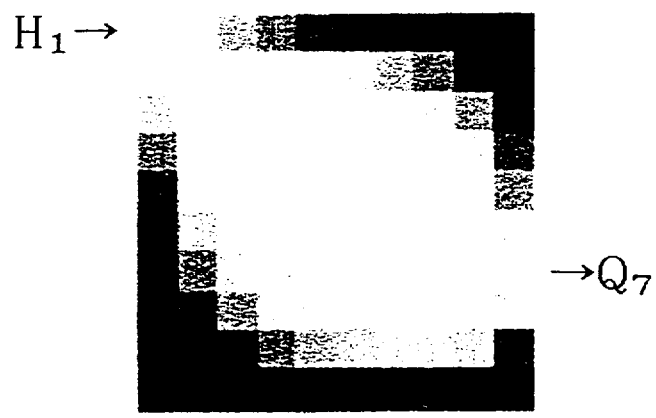
Figure 2I:
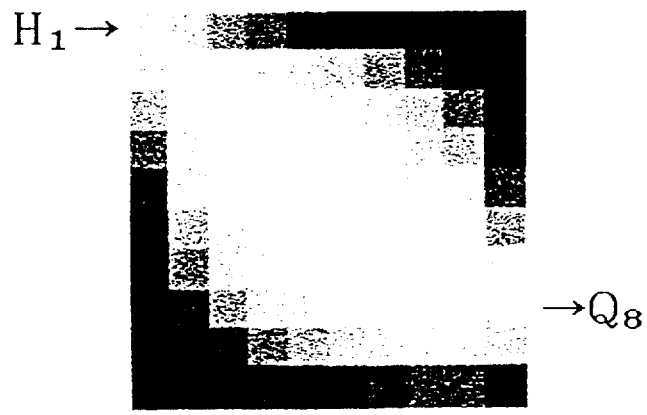
Figure 2J:
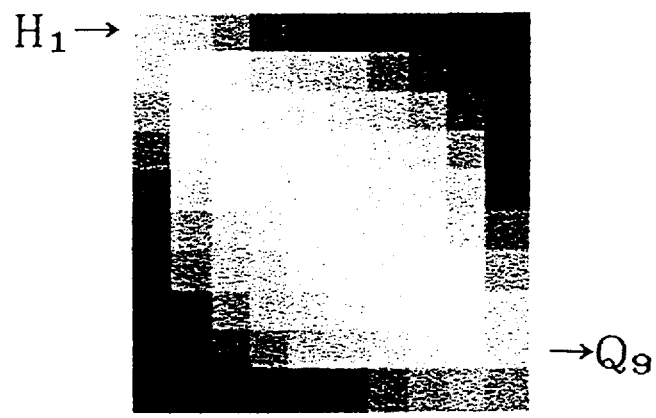
Figure 2K:
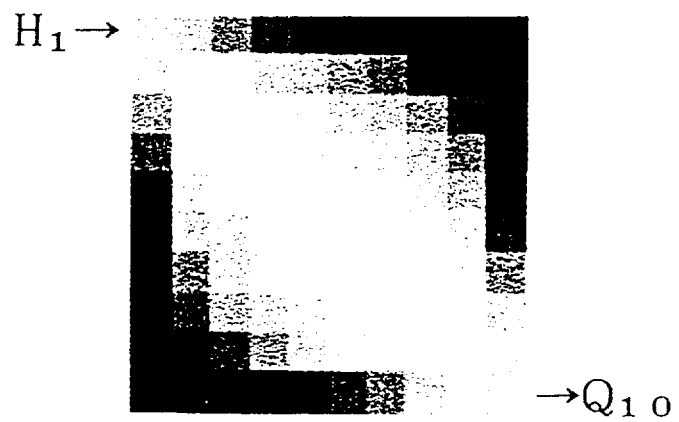

The arrangements and functions of embodiments according to the optical computer tomographic (CT) apparatus and the image reconstruction method using optical computer tomography (CT) of the present invention will be described in detail below with reference to FIGS. 1 to 10. Note that the same reference numerals denote the same parts throughout these drawings and a repetitive description thereof will be omitted.

First Embodiment

FIG. 1 shows the arrangement of an optical CT apparatus according to this embodiment. Referring to FIG. 1, this optical CT apparatus includes a measurement mechanism for measuring the optical characteristics of an object M to be examined and a control arithmetic mechanism 50 for performing arithmetic processing for the measurement data obtained by the measurement mechanism and reconstructing a tomographic image of the object M.

The control arithmetic mechanism 50 consists of a controller 2, an arithmetic unit set 4, a storage unit 6, and a display 8. The controller 2 has a microprocessor unit (MPU) for controlling the operation of the entire apparatus. The arithmetic unit set 4 performs the arithmetic processing for reconstructing a tomographic image of the object M by executing a program formed on the basis of a predetermined algorithm. The storage unit 6 stores various data when the arithmetic unit set 4 performs the arithmetic processing. The display 8 displays, e.g., the tomographic image of the object M obtained by the arithmetic processing.

The arithmetic unit set 4 includes a first arithmetic unit 41, a second arithmetic unit 42, a third arithmetic unit 43, a fourth arithmetic unit 44, and a fifth arithmetic unit 45. The first arithmetic unit 41 performs the first simulation by which an absorption coefficient distribution in which all of a plurality of segments in the object M have the same value is assumed.

The second arithmetic unit 42 performs the second simulation by which an absorption coefficient distribution in which only one segment sequentially selected from the segments in the object M has a specific value is assumed. The third arithmetic unit 43 calculates a light density influence distribution in the object M on the basis of the arithmetic operation results of the first and second simulations.

The fourth arithmetic unit 44 calculates a light density relative ratio distribution with respect to the object M on the basis of the measurement result of the object M obtained by the measurement mechanism and the arithmetic operation result of the first simulation. The fifth arithmetic unit 45 calculates the feature data of the plurality of segments in the object M on the basis of the influence distribution in the object M and the relative ratio distribution with respect to the object M.

The measurement mechanism includes a light-projecting unit 20 for projecting measurement light of a predetermined wavelength onto the object M and a light-receiving unit 30 for actually measuring the measurement light transmitted through the object M. The measurement mechanism operates under the control of the control arithmetic mechanism 50 and outputs the conditions, under which the optical characteristics of the object M are measured, and the resulting data to the control arithmetic mechanism 50.

Here, in the light-projecting unit 20, the input terminal of an optical switch $SW_{in}$ having one-input n-output light branch paths is connected to the light exit end of a light source device 10 which emits measurement light of a predetermined wavelength. Also, n optical fibers F1, F2, ..., Fn are connected to the output terminals of the optical switch $SW_{in}$. In addition, the light exit ends of the n optical fibers F1 to Fn are positioned on the same surface and the n optical fibers F1 to Fn are arranged in n lines along the same direction, forming a so-called light-projecting probe which is mechanically stable. When in use, the light exit ends of the optical fibers F1 to Fn are opposed to or brought into contact with one side of the object M.

The optical switch $SW_{in}$ has a function of selectively turning on one of the n branch paths and turning off the remaining branch paths in accordance with switching control from the controller 2. Consequently, the measurement light from the light source device 10 is individually exclusively guided to the optical fibers F1 to Fn, and light is projected onto the object M only from the light exit end of the optical fiber to which the measurement light is guided. Accordingly, it is possible to perform scan by which, for example, the measurement light is sequentially projected onto portions in different positions of the object M.

The light-receiving unit 30 consists of n optical fibers B1, B2, ..., Bn, an optical switch $SW_{out}$ having n-input one-output light branch paths connected to the light exit ends of these optical fibers B1 to Bn, and a photodetector 12 having a photoelectric conversion device connected to the light output terminal of the optical switch $SW_{out}$. The light incident ends of the n optical fibers $B_1$ to Bn are positioned on the same surface and the n optical fibers B1 to Bn are arranged in n lines along the same direction to form a so-called light-receiving probe which is mechanically stable. When in use, the light incident ends of these optical fibers B1 to Bn are opposed to or brought into contact with the side away from the first side of the object M.

The optical switch $SW_{out}$ has a function of selectively turning on one of the n branch paths and turning off the remaining branch paths in accordance with switching control from the controller 2. Consequently, the measurement light from the optical fibers B1 to Bn is individually exclusively guided to the photoelectric conversion device of the photodetector 12. Accordingly, it is possible to perform detection scan by which, for example, the measurement light from portions in different positions of the object M is sequentially detected.

To actually measure the object M, the light-projecting probe consisting of the optical fibers F1 to Fn and the light-receiving probe consisting of the optical fibers B1 to Bn are arranged to oppose each other on the two sides of the object M. The light from the light source device 10 is sequentially projected onto the object M through the optical fibers F1 to Fn, and light components (light beams) transmitted through the inside of the object M are sequentially guided to the optical fibers B1 to Bn. The photodetector 12 photoelectrically converts and A/D-converts these light components to obtain the data of the optical characteristics of different portions in the object M.

As shown in FIG. 1, a region formed by the n light exit ends of the optical fibers F1 to Fn (the light-projecting probe) and the n light incident ends of the optical fibers B1 to Bn (the light-receiving probe) corresponds to one slice, an image of which is to be reconstructed, of the object M. Accordingly, a plurality of slices can be formed by moving the optical fibers F1 to Fn (the light-projecting probe) and the optical fibers B1 to Bn (the light-receiving probe) in the longitudinal direction (Z-axis direction) in FIG. 1 relative to the object M. By performing image processing (to be described later) on the basis of the measurement data of these slices, a three-dimensional tomographic image in the interior of the object M is reconstructed.

For descriptive simplicity, it is assumed that the object M is placed in an X-Y-Z orthogonal coordinate system, the optical fibers F1 to Fn and the optical fibers B1 to Bn are arranged in the Y-axis direction, and the light exit ends of the optical fibers F1 to Fn and the light incident ends of the optical fibers B1 to Bn are arranged to oppose each other along the X-axis direction. It is also possible to turn on and off a plurality of light sources instead of the optical switches or perform measurements by simultaneously using a plurality of detectors.

Figure 3:
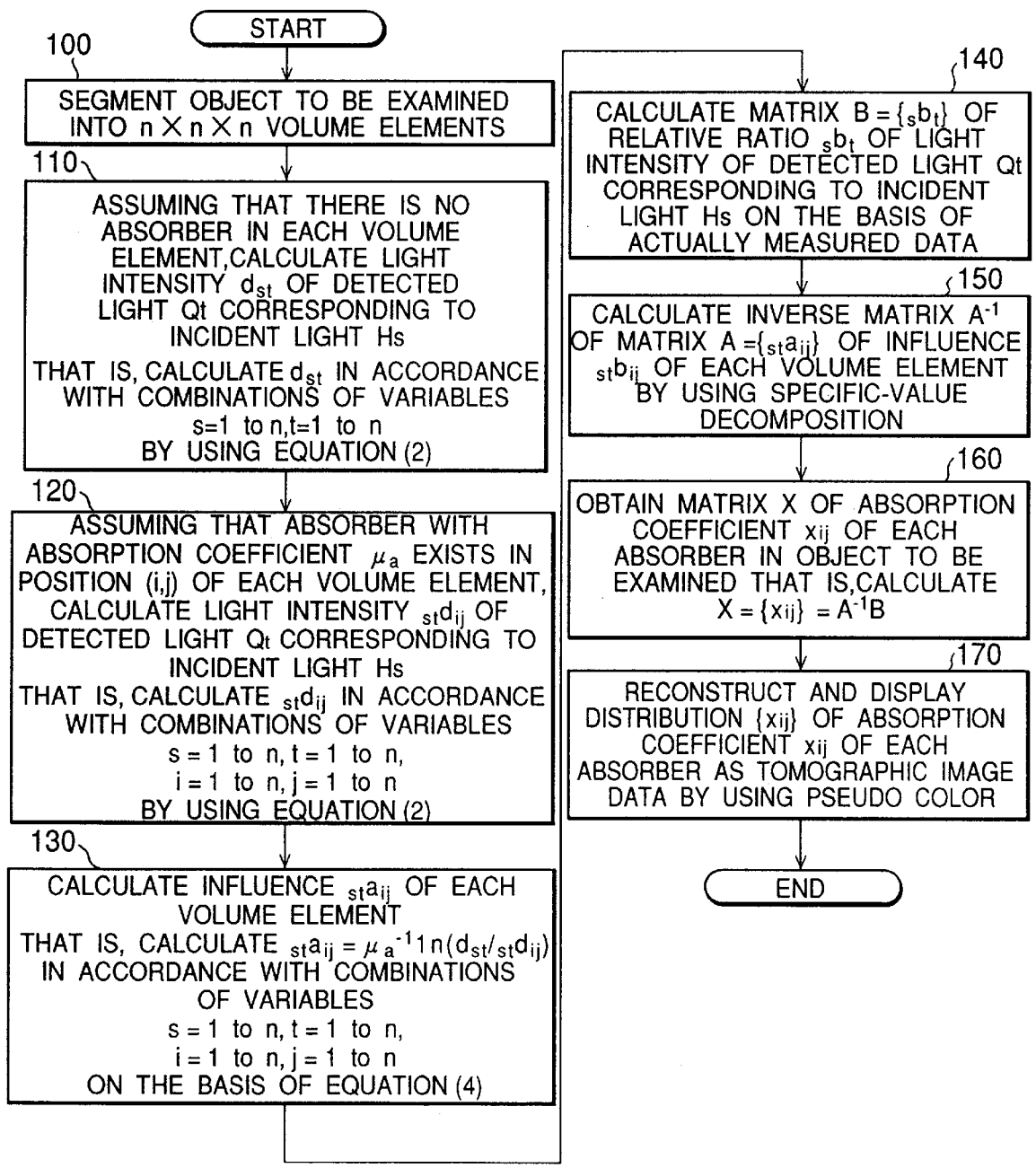
FIG. 3 is a flow chart showing the operation of the optical CT apparatus shown in FIG. 1 in order of processing steps.
Figure 4A:
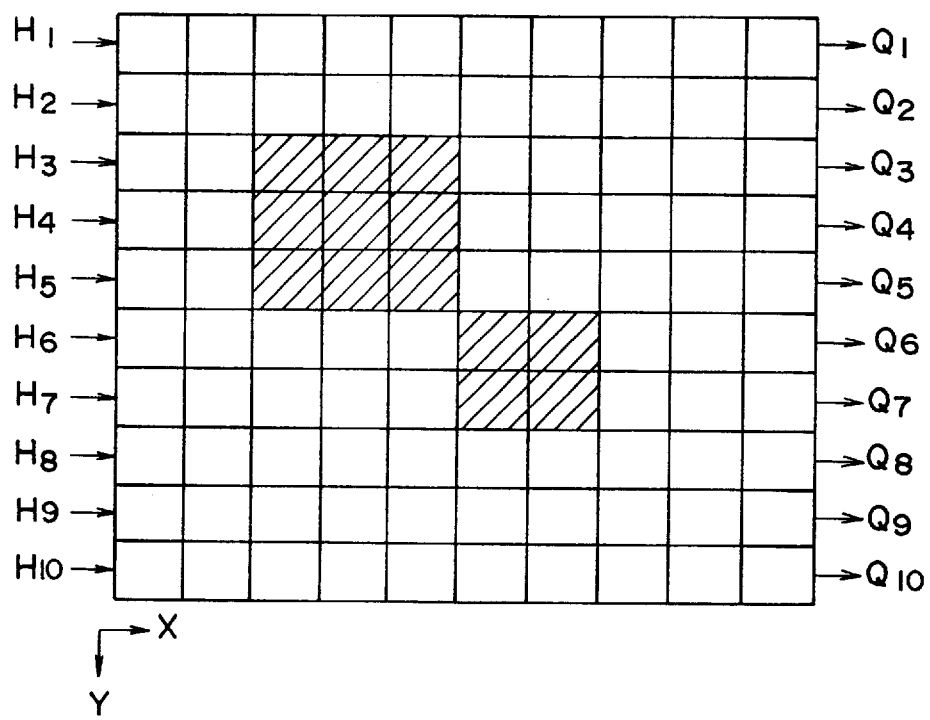
FIG. 4A is a sectional view showing one example of an absorber distribution in the slice shown in FIG. 2A.
Figure 4B:
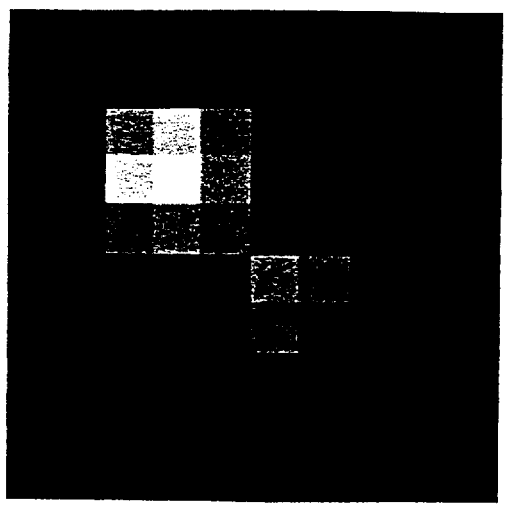
FIG. 4B is a halftone image indicated by displaying on a display the feature data of a plurality of segments obtained by applying simulation based on a difference method to the absorber distribution shown in FIG. 4A.

The operation of this optical CT apparatus and the principle of reconstruction of a tomographic image of the object M will be described below in order of actual processing steps. FIGS. 2A to 2K are views for explaining the reconstruction principle of this embodiment. FIG. 3 is a flow chart showing the operation of the optical CT apparatus of this embodiment in order of processing steps. FIGS. 4A and 4B illustrate the result of an experiment indicating the validity of the reconstruction principle of this embodiment.

(First Processing)

As shown in step 100 of FIG. 3, as an aggregate model of the object M, it is assumed that the object M consists of a plurality of fine segments which are n×n×n volume elements (VOXEL) formed by segmenting the object M in the X-Y-Z coordinate system at the pitch of the optical fibers F1 to Fn or the optical fibers B1 to Bn. The conditions of this setting are previously stored in the controller 2 and the arithmetic unit set 4. As an example, the object M is processed as an aggregate of $100^3$ volume elements assuming that n=100.

In addition, arithmetic programs based on an algorithm described below are previously separately stored in the first to fifth arithmetic units 41 to 45 of the arithmetic unit set 4.

A fixed light diffusion equation for continuous light (luminous flux) entering each volume element is represented by equation (1) below.

$$\Delta\phi - \mu_a D^{-1}\phi = 0 \qquad (1)$$

where $\phi$: the luminous flux (the light density per unit volume)

$\mu_a$: the light absorption coefficient of each volume element $\mu_s'$: the light isotropic scattering coefficient of each volume element D: the diffusion coefficient (D=$\frac{1}{3}\mu_s'$) of each volume element The arithmetic unit set 4 previously stores equation (2) below which approximately represents this fixed light diffusion equation (1) on the basis of a difference method as one method of numerical analysis.

$$\phi_{i,j,k} = \frac{\phi_{i+1,j,k} + \phi_{i-1,j,k} + \phi_{i,j+1,k} + \phi_{i,j-1,k} + \phi_{i,j,k+1} + \phi_{i,j,k-1}}{6 + \mu_a/D} \qquad (2)$$

where suffixes i, j, and k of a luminous flux indicate the coordinates of a plurality of nodes (segments) of the X-Y-Z orthogonal coordinate system, and $\phi_{i,j,k}$ indicates a luminous flux passing through a volume element present in a position (i,j,k) of the X-Y-Z coordinate system. Note that $1 \leq i \leq n$, $1 \leq j \leq n$, and $1 \leq k \leq n$.

The condition of the boundary between the inside and the outside of the object M is represented by equation (3) below.

$$\phi_{BL} = 0 \qquad (3)$$

where a suffix BL indicates the boundary around the object M. Note that equation (3) is equivalent to a condition under which light is completely absorbed by the surface of the object, e.g., a state in which the surface of the object M is completely painted black.

A tomographic image of the object M is reconstructed by using these equations (2) and (3). To simplify the explanation, a description will be made by focusing attention on one slice of the object M as shown in FIG. 2A. That is, assume that one slice on the X-Y coordinate plane is segmented into n×n volume elements (VOXEL) in a one-to-one correspondence with the n optical fibers F1 to Fn and the n optical fibers B1 to Bn.

Assume also that measurement light components projected onto the object M from the light exit ends of the optical fibers F1 to Fn are H1 to Hn and they are collectively called $H_s$. ($1 \leq s \leq n$) as a general expression, that measurement light components detected from the object M by the light incident ends of the optical fibers B1 to Bn are Q1 to Qn and they are collectively called $Q_t$ ($1 \leq t \leq n$) as a general expression, and that the position of each volume element in the X-Y coordinate system is represented by (i,j).

(Second Processing)

By performing the first simulation by using equations (2) and (3) described above, the measurement light components H1 to Hn are projected onto the object M and light intensities $d_{11}$ to $d_{nn}$ of the measurement light components Q1 to Qn detected from the object M are calculated, assuming that absorbers having the same absorption coefficient are present in all volume elements in the model of the object M described above.

Note that in this simulation, it is assumed that no absorber is present in the object M, and perfect diffusion is assumed in equation (2). Assume also that the size of the object M is larger than $1/\mu_s'$ which is the reciprocal of the scattering coefficient $\mu_s'$ and the distance from the exit ends of the optical fibers F1 to Fn to the opposing surface of the object M is L. For example, it is assumed that the size L of the object M is L>>1 mm when the scattering coefficient $\mu_s'$ of all volume elements in the object M is 1.0 mm$^{-1}$. The absorption coefficient $\mu_a$ of all volume elements in the object M is a constant, e.g., $\mu_a$=0.0 mm$^{-1}$.

The first arithmetic unit 41 performs the above simulation. That is, as shown in step 110 of FIG. 3, the first arithmetic unit 41 simulates, by using equation (2) described above, the light density $d_{st}$ of the light Qt ($1 \leq t \leq n$) detected when the position s ($1 \leq s \leq n$) of the projected light Hs is sequentially changed. More specifically, the luminous flux $\phi_{i,j,k}$ calculated by equation (2) when s and t are sequentially changed is used as the light density $d_{st}$.

In practice, a light beam density vector J is calculated by $$J = -D \cdot \text{grad}\{\phi\}$$

on the basis of a Fick's law, and the light density is given by an absolute value |J| of the vector J. However, when compared to the case wherein the light density is $d_{st}$, a relative difference is only the diffusion coefficient D, and so the diffusion coefficient D is reduced by division as indicated by, e.g., equation (5) to be described later. Therefore, practically no problem arises even when the luminous flux $\phi_{i,j,k}$ calculated by equation (2) is used as the light density $d_{st}$.

That is, when each volume element $\Delta v$ is given by $\Delta v = \Delta x \Delta y \Delta z$, the inclination of the luminous flux $\phi$ on the detection surface of each volume element at the X-coordinate is represented by $(\phi_i - \phi_{i-1})/\Delta x$. If $\Delta x = 1$ and $\phi_i = 0$, the light beam density vector J is given by $J = D\phi_{i-1}$. Accordingly, the diffusion coefficient D disappears due to reduction of the dominator and the numerator when the calculation of, e.g., equation (5) to be described later is performed, and so the luminous flux $\phi_{i,j,k}$ is used as the light density $d_{st}$.

In this simulation, light densities $d_{11}$ to $d_{1n}$ of the detected light components Q1 to Qn when it is assumed that only the light H1 is projected are calculated, light densities $d_{21}$ to $d_{2n}$ of the detected light components Q1 to Qn when it is assumed that only the light H2 is projected are calculated, and so on. Finally, light densities $d_{n1}$ to $d_{nn}$ of the detected light components Q1 to Qn when it is assumed that only the light Hn is projected are calculated. The simulation results of these light densities $d_{st}$ ($1 \leq s \leq n$ and $1 \leq t \leq n$) are stored in the storage unit 6.

(Third Processing)

Subsequently, as shown in step 120 of FIG. 3, the second simulation is performed by using equations (2) and (3)

described above, thereby calculating light densities $_{st}d_{ij}$ of the measurement light components Q1 to Qn detected from the object M when the measurement light components H1 to Hn are projected onto the object M by assuming that an absorber having a specific absorption coefficient is present in each volume element in the model of the object M. Note that an absorption coefficient $\mu_a$ of one volume element sequentially selected from all volume elements in the object M is given by, e.g., $\mu_a=0.01$ mm$^{-1}$, and an absorption coefficient $\mu_a'$ of other volume elements in the object M is given by, e.g., $\mu_a'=0.0$ mm$^{-1}$.

That is, in this simulation, it is assumed that an absorber having the absorption coefficient $\mu_a$ is present in one volume element of the object M, and the light densities $_{st}d_{ij}$ of the detected light components Q1 to Qn corresponding to the projected light components H1 to Hn when the absorber is sequentially moved are calculated.

In relation to the light density $_{st}d_{ij}$, a suffix s indicates the position of the projected light Hs, a suffix t indicates the position of the detected light Qt, and suffixes i and j indicate a position (i,j) of a volume element in which an absorber with the absorption coefficient $\mu_a$ is present. Note that $1 \leq s \leq n$, $1 \leq t \leq n$, $1 \leq j \leq n$, and $1 \leq j \leq n$.

The second arithmetic unit 42 performs this simulation of the third processing as shown in step 120 of FIG. 3. The third processing in which the simulation is performed by taking account of the presence of an absorber with the absorption coefficient $\mu_a$ differs from the above second processing in which the simulation is performed by assuming that there is no absorber. However, similar calculations are performed on the basis of equations (2) and (3).

In the second simulation, the light densities of the detected light components Q1 to Qn when it is assumed that an absorber is present in a volume element in position (i,j)=(1,1) and only the light H1 is projected are calculated as $_{11}d_{11}$ to $_{1n}d_{11}$ the light densities of the detected light components Q1 to Qn when it is assumed that an absorber is present in a volume element in position (i,j)=(1,2) and only the light H1 is projected are calculated as $_{11}d_{12}$ to $_{1n}d_{12}$, and so on. Finally, the light densities of the detected light components Q1 to Qn when it is assumed that an absorber is present in a volume element in position (i,j)=(n,n) and only the light Hn is projected are calculated as $_{n1}d_{nn}$ to $_{nn}d_{nn}$. These light densities $_{st}d_{ij}$ are stored in the storage unit 6.

(Fourth Processing)

Assuming that an incident light density is $I_0$, a light density I when the measurement light travels an optical path length L in a medium having an absorption coefficient $\underline{a}$ is as represented by equation (4) below on the basis of a Lambert-Beer's law.

$$I = I_0 exp(-aL) \quad (4)$$

Therefore, equation (5) is obtained by deforming equation (4) by applying the light densities $d_{st}$ and $_{st}d_{ij}$ of the detected light calculated by the first and second simulations, and $_{st}a_{ij}$ is calculated by using, as a new parameter, the degree of influence on the light from a volume element with the absorption coefficient $\mu_a$ present in the position (i,j). Note that this parameter is defined as an influence $_{st}a_{ij}$ $$A = \{_{st}a_{ij}\} = \{\mu_a^{-1} ln(d_{st}/_{st}d_{ij})\} \quad (5)$$

where relating to the influence $_{st}a_{ij}$ a suffix s indicates the position of the projected light Hs, a suffix t indicates the position of the detected light Qt, and suffixes i and j indicate the position (i,j) of each volume element in the object M. These suffixes are variables meeting relations $1 \leq s \leq n$, $1 \leq t \leq n$, $1 \leq i \leq n$, and $1 \leq j \leq n$.

The third arithmetic unit 43 performs the calculation of equation (5) as shown in step 130 of FIG. 3, thereby obtaining matrix $A = \{_{st}a_{ij}\}$ of the influences of all volume elements. This matrix A is stored in the storage unit 6.

FIGS. 2B to 2K illustrate an example of simulation done by assuming a model of a slice segmented into 102 volume elements assuming that n=10. That is, the first to fourth processing steps (simulations) are performed for the ten detected light components Q1 to Q10 obtained when the light H1 is projected. Each of FIGS. 2B to 2K shows an image obtained by displaying the calculation result $_{st}a_{ij}$ of the influence on the display 8.

As is apparent from FIGS. 2B to 2K, when the influence $_{st}a_{ij}$ is calculated from the simulation results of the detected light components Q1 to Q10 obtained when the light H1 is projected onto a volume element in a position (1,1), a dispersion distribution of the detected light components Q1 to Q10 in these volume elements with respect to the projected light H1 is obtained.

As described above, the purpose of the first to fourth processing steps (simulations) is to calculate the matrix A of the influences of volume elements which are previously modeled. This matrix A functions as a so-called coefficient matrix when the tomographic image data of the object M is calculated from the measurement data of the object M as will be described below.

(Fifth Processing)

Subsequently, the measurement mechanism shown in FIG. 1 is used to actually project the measurement light onto the object M and measure the resulting detected light. That is, the optical probes consisting of the optical fibers F1 to Fn and B1 to Bn are brought into contact with the object M or arranged to oppose the object M. Following the same procedures as in the above simulations, the light components H1 to Hn are sequentially selectively projected and light densities $d_{st}'$ (a suffix s indicates the position of the projected light Hs and a suffix t indicates the position of the detected light Qt) of the detected light components Q1 to Qn are measured.

Additionally, the fourth arithmetic unit 4 performs processing shown in step 140 of FIG. 3, i.e., the calculation of equation (6) below, thereby calculating matrix $B = \{_s b_t\}$ of relative ratios $_s b_t$ of the measured light densities $d_{st}'$ to the light densities $d_{st}$ previously obtained by the first simulation. That is, this matrix $B = \{_s b_t\}$ represents the total influence in the object M from the measurement light detected in accordance with the projected light Hs.

$$B = \{_s b_t\} = \{ln(d_{st}/d'_{st})\} \quad (6)$$

(Sixth Processing)

Assuming that the distribution of absorption coefficients inside the object M is matrix $X = \{X_{ij}\}$, equation (7) below is established by using matrix $B = \{_s b_t\}$ of the relative ratio and matrix $A = \{_{st}a_{ij}\}$ of the influence.

$$X = \{x_{ij}\} = A^{-1} B \quad (7)$$

Accordingly, as shown in step 150 of FIG. 3, the fifth arithmetic unit 45 calculates an inverse matrix $A^{-1}$ of the matrix A on the basis of specific-value decomposition. In step 160, the fifth arithmetic unit 45 performs a matrix calculation by applying the inverse matrix $A^{-1}$ to equation (7), thereby calculating absorption coefficient distribution matrix $X = \{x_{ij}\}$ as feature data inside the object M.

Since this absorption coefficient distribution matrix $X = \{x_{ij}\}$ corresponds to the position (i,j) of each volume element, the feature data of each volume element can be extracted by distribution matrix $X = \{x_{ij}\}$.

(Seventh Processing)

Subsequently, the arithmetic unit set 4 positions each value $x_{ij}$ of absorption coefficient distribution matrix $X=\{x_{ij}\}$ to the coordinates of each node in the X-Y coordinate system and performs predetermined color arrangement processing in accordance with the size of each value $x_{ij}$, thereby forming color image data of a slice. In step 170 of FIG. 3, the controller 2 transfers this color image data to the display 8 and reconstructs the slice of the object M in a color display.

In FIG. 4A, it is assumed in accordance with the model shown in FIG. 2A that the scattering coefficient $\mu_s'$ of all volume elements in the object M is 1.0 mm$^{-1}$, absorbers whose absorption coefficient $\mu_a$ is 0.01 mm$^{-1}$ are present in volume elements in two predetermined regions, and no absorbers are present in the other volume elements ($\mu_a$=0.0 mm$^{-1}$). On this assumption, absorption coefficient distribution matrix $X=\{x_{ij}\}$ was calculated by the first to seventh processing steps described above. FIG. 4B shows the result of a graphic display of the calculations.

As shown in FIGS. 4A and 4B, clear distribution matrix $X=\{x_{ij}\}$ was obtained (FIG. 4B) in accordance with the model (FIG. 4A) meeting the above conditions. In this way, the plausibility of the algorithm of the image reconstruction according to this embodiment was confirmed.

In this embodiment as described above, the feature extraction of each volume element in the object M is performed by using a difference method (see equation (2)) for a fixed light diffusion equation, without using a Monte Carlo method. Consequently, a tomographic image of the object M can be reconstructed within a short time period.

For descriptive simplicity, the image reconstruction of one tomographic image on the X-Y coordinate plane has been described. In practice, however, a three-dimensional tomographic image inside the object M is reconstructed by performing the first to seventh processing steps described above for the position (i,j,k) of each volume element by additionally using a position k on the Z-coordinate axis as a parameter.

Also, the constructions of the light-projecting probe and the light-receiving probe are not limited to those of this embodiment. That is, any other construction can be used provided that so-called scan is possible by the construction.

In addition, in the second processing, it is assumed that the absorption coefficient $\mu_a$ of all volume elements in the object M is given by $\mu_a$=0.0 mm$^{-1}$, i.e., there is no absorption. However, a case in which absorption exists ($\mu_a \neq 0$) is also possible. In this case, the influence $_{st}a_{ij}$ can be calculated in the same manner as above by scanning a volume element having an absorption coefficient different from that of the object M.

Furthermore, in steps 150 and 160 of FIG. 3 in the sixth processing, tomographic data $X=\{x_{ij}\}$ is directly calculated from the inverse matrix $A^{-1}$ as indicated by equation (7). However, the solution of the tomographic data X can also be calculated by successive approximation using equations (8) and (9) below, instead of equation (7).

$$x_{ij}^n = x_{ij}^{n-1} + \frac{\sum_s \sum_t {}_{st}a_{ij}\left\{\left(\frac{d_{st}-d_{st}'}{d_{st}}\right) - {}_sb_t^{n-1}\right\}}{\sum_s \sum_t {}_{st}a_{ij}} \quad (8)$$

$$_sb_t^n = \frac{\sum_s \sum_t {}_{st}a_{ij}x_{ij}^n}{\sum_s \sum_t {}_{st}a_{ij}} \quad (9)$$

In order to start the calculations of equations (8) and (9) above from n=1 when they are performed for ranges of $1 \leq i \leq n$, $1 \leq j \leq n$, $1 \leq s \leq n$, and $1 \leq t \leq n$, the calculation of equation (8) is first performed by using, e.g., $_sb_t^0=0$ and $x_{ij}^0=0$ as initial values and then the calculation of equation (9) is performed. The value of n is successively increased, and the calculations are completed when $x_{ij}^n - x_{ij}^{n-1} < \epsilon$ is reached. Note that $\epsilon$ is a constant representing the calculation accuracy.

$x_{ij}^n$ represents a change (or an absolute value of a change if the reference value is 0) from the reference value of the nth absorption coefficient of a volume element (i,j). $_{st}a_{ij}$ represents an influence (weighting coefficient) resulting from a pair of s and t of the projected light Hs and the detected light Qt of the volume element (i,j). $d_{st}$ represents the light density of the detected light Qt previously calculated by the simulation for the relationship between the projected light Hs and the detected light Qt.

$d_{st}'$ represents the light density of the detected light Qt actually measured with respect to the relationship between the projected light Hs and the detected light Qt. $_sb_t^n$ represents a relative ratio (attenuation value) for the pair of s and t of the projected light Hs and the detected light Qt, and indicates the nth value.

Second Embodiment

In the first embodiment, continuous light is used as light projected onto an object M to be examined. In this embodiment, however, pulse light is used as the projected light. The basic construction of an optical CT apparatus according to this embodiment is the same as that shown in FIG. 1 except that pulse light is emitted at a predetermined timing from a light source 10 and used as projected light Hs by sequentially switching an optical switch SW$_{in}$ in synchronism with the timing of emission.

By performing processing steps analogous to the first to seventh processing steps explained in the first embodiment, each value $x_{ij}$ of absorption coefficient distribution matrix $X=\{x_{ij}\}$ is finally positioned to the coordinates of each node in the X-Y coordinate system. In addition, predetermined color arrangement processing is performed in accordance with the size of each value $x_{ij}$ of the absorption coefficient, thereby forming color image data of a slice. Thereafter, the slice of the object M is reconstructed in a color display.

Figure 5:
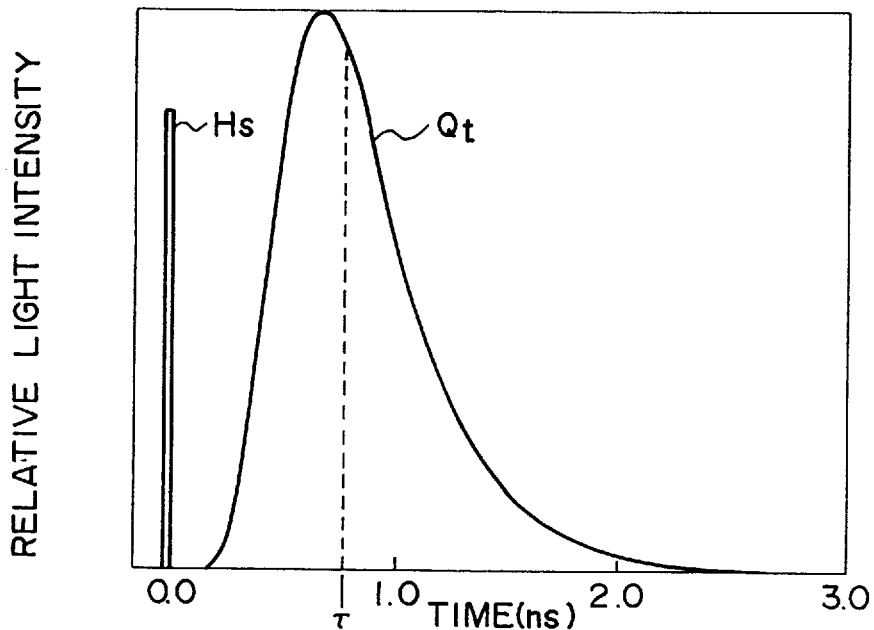
FIG. 5 is a graph showing the time-resolved waveform of detected light obtained by applying simulation based on a difference method when measurement light which is pulse light is projected onto an object to be examined in an optical CT apparatus according to the second embodiment of the present invention.

In this embodiment, when light Qt detected upon projection of the light Hs onto the object M is simulated, detected light Qt having a time-resolved waveform is obtained as shown in FIG. 5. Similar detected light Qt having a time-resolved waveform is obtained when an actual object M to be examined is measured under the same conditions. Accordingly, an image of the interior of the object M can be reconstructed even by performing the first to seventh processing steps explained in the first embodiment by using the pulse projected light Hs.

Furthermore it should be noted that since the detected light Qt obtained by simulation or actual measurement has a time-resolved waveform as shown in FIG. 5, it is possible to divide this waveform into a left-side portion (a portion which is temporally before time τ) and a right-side portion (a portion which is temporally after time τ) and perform image reconstruction arithmetic processing on the basis of information in these portions.

Since the left- and right-side portions have different influences inside the object M, the amount of information can be increased compared to the first embodiment. Accordingly, high-accuracy image reconstruction is realized. In the first embodiment, continuous light is used as the projected light Hs and so the detected light Qt is the sum of the left- and right-side portions shown in FIG. 5. Therefore, the information amount is smaller than that in the second embodiment.

Also, when the information in the left-side portion of the detected light shown in FIG. 5 is used, a light beam propagating fast through the object M is processed. Since this relatively narrows a region caused by the influence in corresponding with the position, a clear tomographic image can be reconstructed.

Additionally, image reconstruction is performed by using light density values at various moments in the time-resolved waveform shown in FIG. 5. Therefore, adjusting processing for reconstructing the clearest tomographic images can be performed for various objects M to be examined having different physical characteristics.

Figure 6:
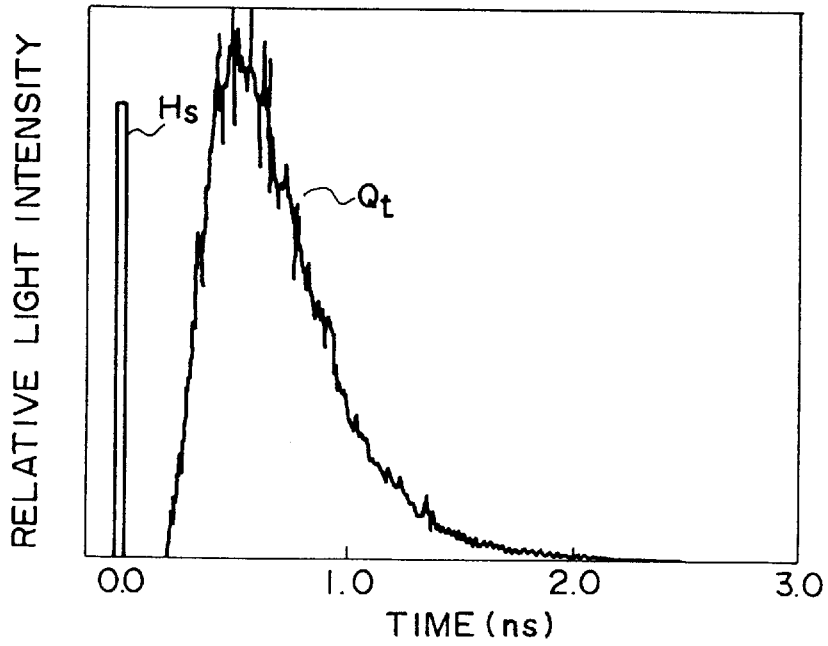
FIG. 6 is a graph showing the time-resolved waveform of detected light obtained by applying simulation based on a Monte Carlo method when measurement light which is pulse light is projected onto an object to be examined in the optical CT apparatus according to the second embodiment of the present invention.

Furthermore, in this second embodiment detected light having little noise component as shown in FIG. 5 is obtained by applying the difference method described previously. In a conventional Monte Carlo method, however, detected light having a noise component as shown in FIG. 6 is obtained. Accordingly, this embodiment can reconstruct clearer tomographic images within shorter time periods than in the Monte Carlo method.

Third Embodiment

In this embodiment, an optical CT apparatus having the same system configuration as in FIG. 1 is used. However, an arithmetic unit set 4 reconstructs a tomographic image of an object M to be examined by approximating a light diffusion equation to a finite element equation on the basis of a finite element method as one method of numerical analysis. That is, the object M is decomposed into a finite number of small portions (elements) as a plurality of fine segments. The characteristic of each element is approximated by a mathematical model and these approximated characteristics are collectively used to form a whole model, thereby solving a tomographic image.

The principle of simulation will be described below with reference to a flow chart in FIG. 7 which illustrates the procedure of this embodiment. When an object to be analyzed is segmented into finite elements, a light density distribution P(x,y,z,t) in each finite element is represented by equation (10) below.

$$P(x,y,z,t) = [N(x,y,z)]\{\phi(t)\} \tag{10}$$

where [N(x,y,z)] is an interpolative function matrix which connects the light density of a node in a three-dimensional orthogonal coordinate system to the light density in each element, and $\{\phi(t)\}$ is the node light density vector of the finite element at time t.

Equation (11) below is obtained as a general light diffusion equation by applying a Galerkin method by using the interpolative function matrix [N] as a weighting function.

$$\int_{Ve} [N]^T \left\{ \left[ \frac{\partial^2 P}{\partial x^2} + \frac{\partial^2 P}{\partial y^2} + \frac{\partial^2 P}{\partial z^2} - \frac{\mu_a}{D} p - \frac{1}{D} \frac{\partial P}{\partial t} \right] \right\} dv = 0 \tag{11}$$

where relating to an interpolative function matrix $[N]^T$, a superscript T represents transposition, Ve represents the region of an element, $\mu_a$ represents the absorption coefficient of light, and D represents a diffusion coefficient.

Further modifying and rearranging equation (11) above yields equation (12) below.

$$[k]\{\phi\} + [c]\left\{ \frac{\partial \phi}{\partial t} \right\} = \{f\} \tag{12}$$

Element matrices [k] and [c] and a vector [f] are defined by equations (13) to (15) below.

$$[k] = \int_{Ve} \left[ \frac{\partial [N]^T}{\partial x} \frac{\partial [N]}{\partial x} + \frac{\partial [N]^T}{\partial y} \frac{\partial [N]}{\partial y} + \frac{\partial [N]^T}{\partial z} \frac{\partial [N]}{\partial z} \right] dv \tag{13}$$

$$[c] \int_{Ve} \frac{1}{D} [N]^T [N] dv \tag{14}$$

$$\{f\} = \int_{Ve} \left[ -\frac{\mu_a}{D} \phi [N]^T \right] dv - \int_{Se} q[N]^T ds \tag{15}$$

where q indicates a light beam density and Se indicates a boundary surrounding a region Ve.

Furthermore, a finite element equation of the whole object to be examined is represented by equation (16) below by applying equation (12) above.

$$[K]\{\Phi\} + [C]\left\{ \frac{\partial \Phi}{\partial t} \right\} = \{F\} \tag{16}$$

where $\{\Phi\}$ is a node light density vector of the whole object M, [K] is a light conduction matrix, [C] is a light capacity matrix, and {F} is a light beam matrix. These matrices $\{\Phi\}$, [K], [C], and {F} represent that all elements Ve in the object M are added as indicated by equations (17-a) to (17-d) below.

$$\{\Phi\} = \sum_e \{\phi\} \tag{17-a}$$

$$[K] = \sum_e [k] \tag{17-b}$$

$$[C] = \sum_e [c] \tag{17-c}$$

$$\{F\} = \sum_e \{f\} \tag{17-d}$$

Especially when the measurement light is continuous light, the term $$\frac{1}{D} \frac{\partial P}{\partial t}$$

in equation (1) can be neglected. Therefore, equation (16) above is rearranged into equation (18) below.

$$[K]\{\Phi\} = \{F\} \tag{18}$$

Note that exactly the same finite element equation can also be obtained by a finite element method based on a Ritz method.

Figure 7:
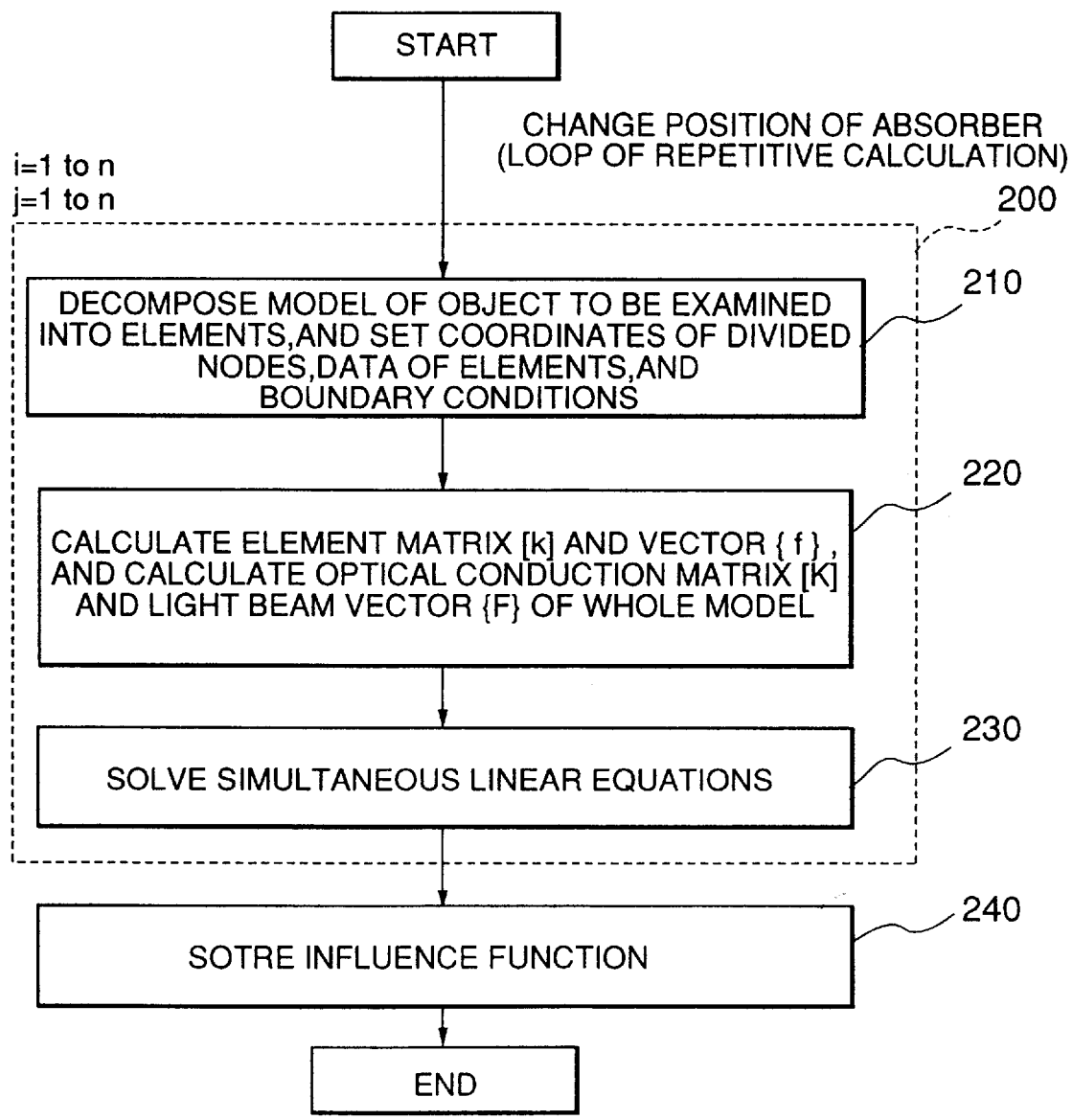
FIG. 7 is a flow chart showing the operation of an optical CT apparatus according to the third embodiment of the present invention in order of processing steps.

As shown in step 210 of FIG. 7, the object M is segmented into elements as an aggregate model, and the segmented node coordinates, the data of the finite elements, and the boundary conditions are set. Thereafter, as shown in step 220, a matrix [k] and a vector {f} of each finite element are calculated and a matrix [K] and a vector {F} of the whole model are synthesized. In step 230, a light density $\phi$ of a point of interest is calculated by solving simultaneous linear equations.

As shown in step 200 of FIG. 7, by using this calculation method and assuming that the absorption coefficient in the object to be examined is $\mu_a = \mu_{a1}$ and the absorption coefficient to be moved to calculate the influence is $\mu_a = \mu_{a2}$, calculations are performed by using a scanning method similar to the difference method explained in the first embodiment. That is, since a light density $(_{st}\phi_{ij})\mu_{a1}$ of all elements when the absorption coefficient is $\mu_a=\mu_{a1}$ and a light density $(_{st}\phi_{ij})\mu_{a2}$ of all elements when the absorption coefficient is $\mu_a=\mu_{a2}$ are obtained by simulations, influence $A=\{_{st}a_{ij}\}$ is obtained by a calculation similar to equation (5) as shown in step 240.

Also, matrix $B=\{_{st}\phi_t\}$ of the relative ratio of the light intensity (light density) of the detected light obtained by the actual measurement and the light intensity (light density) obtained by the simulation is obtained by a calculation similar to equation (6). Additionally, a matrix calculation analogous to equation (7) is performed for the influence A and the relative ratio matrix B, thereby calculating absorption coefficient distribution $X=\{x_{ij}\}$ of all elements in the object M. A tomographic image of the object M can be reconstructed by displaying the elements on the basis of the absorption coefficient distribution X.

In this embodiment, tomographic images can also be reconstructed by using pulse light as the projected light Hs as in the second embodiment.

Fourth Embodiment

This embodiment uses an optical CT apparatus having the same system configuration as shown in FIG. 1. However, a tomographic image of an object M to be examined is reconstructed by approximating a light diffusion equation to a finite volume equation on the basis of a finite volume (control volume) method as one method of numerical analysis in an arithmetic unit set 4. That is, the object M is segmented into a finite number of small portions (finite volumes) as a plurality of fine segments. The characteristic of each finite volume is approximated by a mathematical model and these approximated characteristics are used to form a whole model, thereby solving a tomographic image.

As can be seen from equation (1) presented earlier, the diffusion equation of light incident on each finite volume when the object M to be analyzed is segmented into finite volumes is represented by equation (19) below.

$$\frac{1}{cD}\frac{\partial\phi}{\partial t} = \Delta\phi - \frac{\mu_a}{D}\phi \tag{19}$$

Integrating equation (19) by a time $\Delta t$ and a finite volume $\Delta v$ yields equation (20) below, and discretizing and rearranging equation (20) yields equation (21) below. Note that $\Delta v=\Delta x\Delta y\Delta z$.

$$\frac{1}{cD\Delta t}\int\int_{\Delta V}\int_t^{t+\Delta t}\frac{\partial\phi}{\partial t}dtdv = \tag{20}$$

$$\frac{1}{\Delta t}\int_t^{t+\Delta t}\int_{\Delta V}\Delta\phi dvdt - \frac{\mu_a}{D\Delta t}\int_t^{t+\Delta t}\int_{\Delta V}\phi dvdt$$

$$a_P\phi_P = a_E\phi_E + a_W\phi_W + a_N\phi_N + a_S\phi_S + a_T\phi_T + a_B\phi_B + b \tag{21}$$

where $\phi$ is the light density per unit volume, $\mu_a$ is the light absorption coefficient of each finite volume, D is the diffusion coefficient $(D=\frac{1}{3}\mu_s'$; where $\mu_s'$ is the transportation scattering coefficient) of each finite volume, and c is the light velocity in a medium. Also, $a_P$, $a_E$, $a_W$, $a_N$, $a_S$, $a_T$, and $a_B$ indicate coefficients at a defining lattice point P of the light density $\phi$ and its adjacent lattice points E, W, N, S, T, and B.

Figure 8:
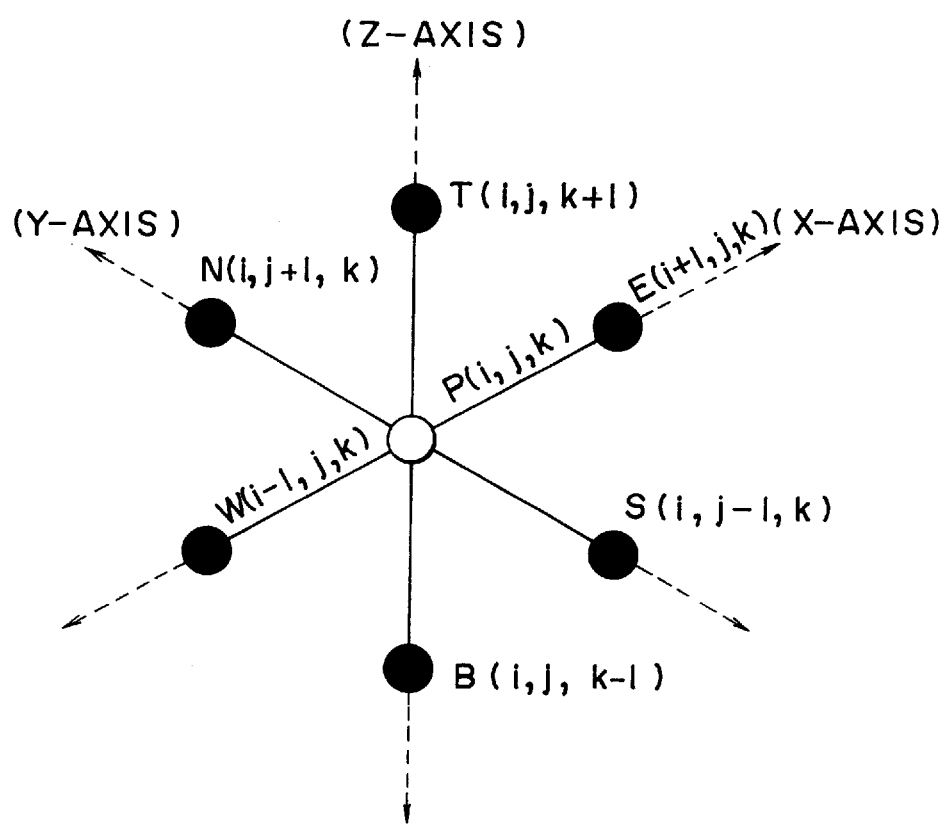
FIG. 8 is a plan view showing the coordinates of a plurality of lattice points adjacent to one lattice point in an object to be examined in an optical CT apparatus according to the fourth embodiment of the present invention.
Figure 9A:
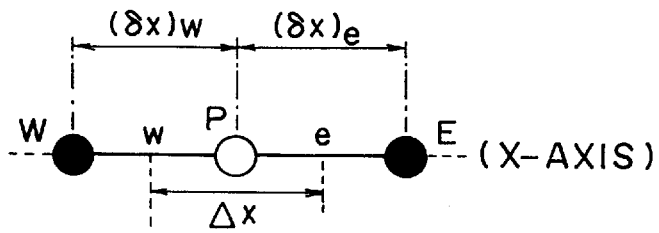
FIGS. 9A to 9C are plan views each showing the distance between adjacent lattice points, of the lattice points shown in FIG. 8, positioned inside the object.
Figure 9B:
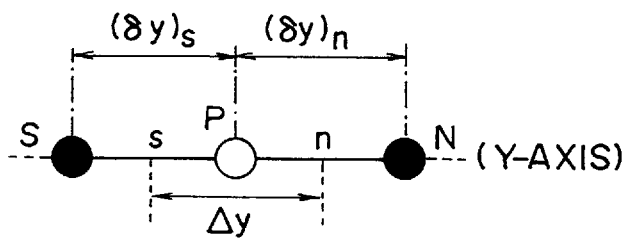
Figure 9C:
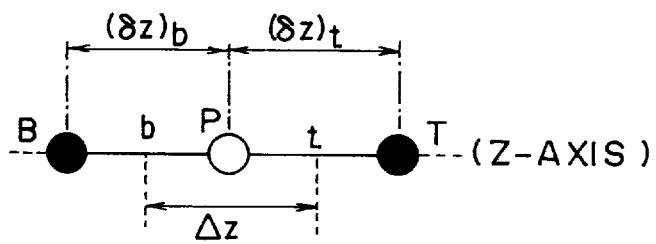

That is, as shown in FIG. 8, assuming that the position of the lattice point P is a position (i,j,k) in a three-dimensional X-Y-Z orthogonal coordinate system, the lattice points W, E, S, N, B, and T represent coordinates (i−1,j,k), (i+1,j,k), (i,j−1,k), (i,j+1,k), (i,j,k−1), and (i,j,k+1), respectively. Also, as shown in FIGS. 9A to 9C, the distances from the lattice point P to these adjacent lattice points E, W, N, S, T, and B are $(\delta x)_w$, $(\delta x)_e$, $(\delta y)_s$, $(\delta y)_n$, $(\delta z)_t$, and $(\delta z)_b$, respectively. In addition, each finite volume $\Delta v$ has a relation of $\Delta v=\Delta x\Delta y\Delta z$.

These coefficients $a_P$, $a_E$, $a_W$, $a_N$, $a_S$, $a_T$, and $a_B$, are represented by equations (22-a) to (22-f) and (22-i) below, and a coefficient $a^0_P$ and an initial value b at the defining point P at time t=0 are represented by equations (22-g) and (22-h) below.

$$a_E = \frac{cD_e\Delta y\Delta z}{(\delta x)_e} \tag{22-a}$$

$$a_W = \frac{cD_w\Delta y\Delta z}{(\delta x)_w} \tag{22-b}$$

$$a_N = \frac{cD_n\Delta x\Delta z}{(\delta y)_n} \tag{22-c}$$

$$a_S = \frac{cD_s\Delta x\Delta z}{(\delta y)_s} \tag{22-d}$$

$$a_T = \frac{cD_t\Delta y\Delta x}{(\delta z)_t} \tag{22-e}$$

$$a_B = \frac{cD_b\Delta y\Delta x}{(\delta z)_b} \tag{22-f}$$

$$a_P^0 = \frac{\Delta x\Delta y\Delta z}{\Delta t} \tag{22-g}$$

$$b = a_P^0\phi_P^0 \tag{22-h}$$

$$a_P = a_E + a_W + a_N + a_S + a_T + a_B + a_P^0 + C\mu_a\Delta x\Delta y\Delta z \tag{22-i}$$

Accordingly, a tomographic image is reconstructed by performing the following processing by using equations (21) and (22-a) to (22-i) described above.

(First Processing)

First, the absorption coefficient $\mu_a$ of each finite volume in the object M is sequentially moved by assuming $\mu_a=\mu_{a1}$, and scan is performed by sequentially changing a position s ($1 \leq s \leq n$) of the projected light Hs. A light density $(_{st}\phi_{ij})\mu_{a1}$ of each detected light Qt ($1 \leq t \leq n$) is calculated by simulation.

More specifically, after the coefficients $a_P$, $a_E$, $a_W$, $a_N$, $a_S$, $a_T$, $a_B$, and b are calculated on the basis of equations (22-a) to (22-i), the light density $\phi$ at each lattice point is calculated by substituting these coefficients into equation (21) described above. This processing is done by the arithmetic unit set 4 shown in FIG. 1, and the data of the calculated light density $\{_{st}\phi_{ij}\}\mu_{a1}$ is stored in a storage unit 6.

(Second Processing)

Subsequently, the absorption coefficient $\mu_a$ of each finite volume in the object M is sequentially moved by assuming $\mu_a=\mu_{a2}$, and scan is performed by sequentially changing the position s ($1 \leq s \leq n$) of the projected light Hs. A light density $(_{st}\phi_{ij})\mu_{a2}$ of each detected light Qt ($1 \leq t \leq n$) is calculated by simulation.

More specifically, after the coefficients $a_P$, $a_E$, $a_W$, $a_N$, $a_S$, $a_T$, $a_B$, and b are calculated on the basis of equations (22-a) to (22-i), the light density $\phi$ at each lattice point is calculated by substituting these coefficients into equation (21) described above. This processing is done by the arithmetic unit set 4 shown in FIG. 1, and the data of the calculated light density $\{_{st}\phi_{ij}\}\mu_{a2}$ is stored in the storage unit 6.

(Third Processing)

Subsequently, the ratio of the light density $(_{st}\phi_{ij})\mu_{a1}$ to the light density $(_{st}\phi_{ij})\mu_{a2}$ is calculated on the basis of equation (23) below, thereby calculating influence matrix $WG=\{_{st}wg_{ij}\}$.

$$WG=\{{}_{st}wg_{ij}\}=\{(\mu_{a2}-\mu_{a1})^{-1}ln[({}_{st}\phi_{ij})\mu_{a1}/({}_{st}\phi_{ij})\mu_{a2}]\} \quad (23)$$

In the first and second processing steps, the light densities $({}_{st}\phi_{ij})\mu_{a1}$ and $({}_{st}\phi_{ij})\mu_{a2}$ are calculated for the light density $\phi$ at each lattice point. Therefore, influence matrix $WG=\{{}_{st}wg_{ij}\}$ is also calculated for the light density $\phi$ at each lattice point. Calculated matrices $WG=\{{}_{st}wg_{ij}\}$ are also stored in the storage unit 6.

(Fourth Processing)

Subsequently, the light Hs is actually projected onto the object M while the position s is shifted, and the detected light Qt is measured to obtain the light density $({}_{st}\phi_{ij})$ of a pair of s and t of the detected light with respect to the projected light. A calculation of equation (24) below is performed for the actually measured light density $({}_{st}\phi_{ij})$ and the light density $({}_{st}\phi_{ij})\mu_{a1}$ obtained by the simulation, thereby calculating relative ratio matrix $B=\{{}_{s}\phi_{t}\}$. In addition, a calculation of equation (25) below is performed for the influence matrix WG obtained by the simulation described above and the relative ratio matrix B, thereby calculating distribution matrix $X=\{x_{ij}\}$ of absorption coefficients of the finite volumes in the object M.

$$B=\{{}_{s}\phi_{t}\}=\{ln[({}_{st}\phi_{ij})\mu_{a1}/({}_{st}\phi_{ij})]\} \quad (24)$$

$$X=\{x_{ij}\}=WG^{-1}B \quad (25)$$

As described above, the absorption coefficient of each finite volume for constructing a tomographic image can also be calculated by the use of the finite volume method. On the basis of this distribution matrix X, a tomographic image of the object M can be reconstructed.

When fixed light (continuous light) is used, distribution matrix $X=\{x_{ij}\}$ for forming a tomographic image can be calculated by performing the first to fourth processing steps described above by using equations (26) and (27-a) to (27-g) below instead of equations (21) and (22-a) to (22-i) described above.

$$a_P\phi_P = a_E\phi_E + a_W\phi_W + a_N\phi_N + a_S\phi_S + a_T\phi_T + a_B\phi_B \quad (26)$$

$$a_E = \frac{D_e\Delta y\Delta z}{(\delta x)_e} \quad (27\text{-a})$$

$$a_W = \frac{D_w\Delta y\Delta z}{(\delta x)_w} \quad (27\text{-b})$$

$$a_N = \frac{D_n\Delta x\Delta z}{(\delta y)_n} \quad (27\text{-c})$$

$$a_S = \frac{D_s\Delta x\Delta z}{(\delta y)_s} \quad (27\text{-d})$$

$$a_T = \frac{D_t\Delta y\Delta x}{(\delta z)_t} \quad (27\text{-e})$$

$$a_B = \frac{D_b\Delta y\Delta x}{(\delta z)_b} \quad (27\text{-f})$$

$$a_P = a_E + a_W + a_N + a_S + a_T + a_B + \mu_a\Delta x\Delta y\Delta z \quad (27\text{-g})$$

Figure 10:
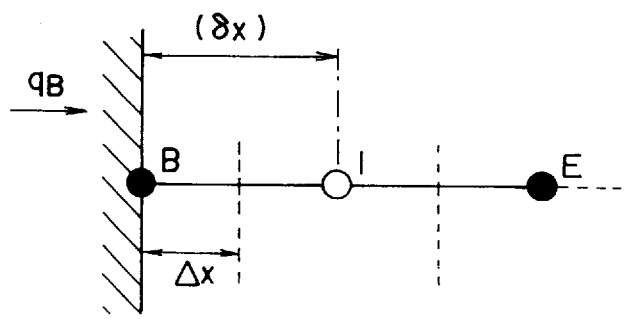
FIG. 10 is a plan view showing the distance between adjacent lattice points, of the lattice points shown in FIG. 8, positioned in the boundary between the object and the outside.

In the above processing method, a tomographic image is obtained by assuming that all finite volumes have a predetermined volume $\Delta v$. However, to obtain the distribution matrix X of, e.g., a boundary portion where the object M is in contact with an outside environment, a semi-finite volume as shown in FIG. 10 (the x-coordinate is shown as a representative) is assumed, and the first and second processing steps described above are performed by using equations (28-a) to (28-d) in place of equations (21) and (22-a) to (22-i).

$$a_B\phi_B = a_I\phi_I + b \quad (28\text{-a})$$

$$a_I = \frac{D_i}{(\delta x)_i} \quad (28\text{-b})$$

$$b = q_B \quad (28\text{-c})$$

$$a_B = a_I + \mu_a\Delta X \quad (28\text{-d})$$

where I represents a defining lattice point, and B and E represent adjacent lattice points at the x-coordinate.

Also, assuming that the optical transfer rate is h, the ambient light density is $\phi_f$, and the light density in a boundary plane B is $\phi_B$, a light beam $q_B$, is given by $q_B=h(\phi_f-\phi_B)$, and $b=h\phi_f$ and $a_B=a_I+\mu_a\Delta x+h$.

In this embodiment, tomographic images can also be reconstructed by using pulse light as the projected light Hs as in the second embodiment.

In the present invention as has been described above, the feature extraction of each volume element in an object to be examined is performed on the basis of a predetermined algorithm using a difference method or the other methods, without using a conventional Monte Carlo method, and a tomographic image is reconstructed on the basis of the feature extraction data.

Accordingly, the operating speed is high and this makes rapid image reconstruction feasible. As a result, the present invention can be effectively used to put a medical optical CT apparatus for reconstructing tomographic images of living bodies into practice.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 006619/1996 filed on Jan. 18, 1996 is hereby incorporated by reference.

What is claimed is:

1. An optical computer tomographic apparatus comprising:

a light-projecting unit for individually exclusively projecting measurement light onto a plurality of different first portions of an object to be examined;

a light-receiving unit for individually exclusively receiving the measurement light emitted from said light-projecting unit and transmitted through the object in a plurality of different second portions of the object; and an arithmetic control mechanism for controlling operations of said light-projecting unit and said light-receiving unit, thereby reconstructing a tomographic image of the object on the basis of a scattering absorption state of the measurement light entering the object, wherein said arithmetic control mechanism comprises a first arithmetic unit for calculating light densities of the measurement light obtained in the plurality of second portions on the basis of a numerical analysis method which approximates a predetermined light diffusion equation, when it is assumed that the object is divided into a plurality of fine segments as an aggregate model and all the plurality of segments have the same value as an absorption coefficient under conditions equivalent to the conditions by which the object is measured by using said light-projecting unit and said light-receiving unit, a second arithmetic unit for calculating light densities of the measurement light obtained in the plurality of second portions on the basis of the numerical analysis method, when it is assumed that only one segment sequentially selected from the plurality of segments has a specific value as an absorption coefficient under the conditions equivalent to the conditions by which the object is measured by using said light-projecting unit and said light-receiving unit, a third arithmetic unit for calculating, as influences of the plurality of segments, ratios of the light densities of the plurality of second portions calculated by said first arithmetic unit to the light densities of the plurality of second portions calculated by said second arithmetic unit, thereby obtaining an influence matrix corresponding to an arrangement of the plurality of segments, a fourth arithmetic unit for calculating relative ratios of the light densities of the measurement light obtained in the plurality of second portions on the basis of the actual measurements done by using said light-projecting unit and said light-receiving unit to the light densities in the plurality of second portions calculated by said first arithmetic unit, thereby obtaining a relative ratio matrix corresponding to arrangements of the pluralities of first and second portions, and a fifth arithmetic unit for performing a matrix calculation by using the influence matrix obtained by said third arithmetic unit and the relative ratio matrix obtained by said fourth arithmetic unit, thereby obtaining feature data of the plurality of segments.

2. An apparatus according to claim 1, wherein the numerical analysis method is a difference method which solves the light diffusion equation by approximating the equation to a difference equation, and the segments are volume elements arranged at equal intervals in the object on the basis of a predetermined coordinate system.

3. An apparatus according to claim 1, wherein the numerical analysis method is a finite element method which solves the light diffusion equation by approximating the equation to a finite element equation, and the segments are finite elements which are a finite number of elements freely separately arranged in the object.

4. An apparatus according to claim 1, wherein the numerical analysis method is a finite volume method which solves the light diffusion equation by approximating the equation to a finite volume equation, and the segments are finite volumes which are a finite number of volumes freely separately arranged in the object.

5. An apparatus according to claim 1, wherein when it is assumed that each of the absorption coefficients of the segments is zero, said first arithmetic unit calculates the light densities of the plurality of segments on the basis of the numerical analysis method.

6. An apparatus according to claim 1, wherein said fifth arithmetic unit obtains a distribution of absorption coefficients in the object as the feature data of the plurality of segments.

7. An apparatus according to claim 1, wherein said light-projecting unit emits continuous light as the measurement light to be projected onto the object, and said light-receiving unit continuously detects the exit measurement light from the object.

8. An apparatus according to claim 1, wherein said light-projecting unit emits pulse light as the measurement light to be projected onto the object, and said light-receiving unit detects the exit measurement light from the object by a predetermined time-resolved measurement.

9. An apparatus according to claim 1, wherein said light-projecting unit comprises a light source for generating the measurement light, a plurality of optical fibers for projecting the measurement light emitted from said light source onto the object, and an optical switch which connects said light source and said plurality of optical fibers by using light branch paths and selectively opens only one of a plurality of output terminals constituting said light branch paths.

10. An apparatus according to claim 1, wherein said light-receiving unit comprises a plurality of optical fibers for extracting the measurement light from the object, a photoelectric conversion device for photoelectrically converting the incident measurement light from said plurality of optical fibers, and an optical switch which connects said plurality of optical fibers and said photoelectric conversion device by using light branch paths and selectively opens only one of a plurality of input terminals constituting said light branch paths.

11. An apparatus according to claim 1, wherein said arithmetic control mechanism further comprises a storage unit for storing various data detected by said light-receiving unit and various data calculated by said first to fifth arithmetic units, and a controller for sequentially controlling operations of said light-projecting unit, said light-receiving unit, and said first to fifth arithmetic units.

12. An apparatus according to claim 1, further comprising a display for processing input image data from said arithmetic control mechanism and displaying a tomographic image of the object.

13. An image reconstruction method using optical computer tomography, comprising:

the first step of controlling operations of a light-projecting unit and a light-receiving unit by using an arithmetic control mechanism, thereby causing said light-projecting unit to individually exclusively project measurement light onto a plurality of different first portions of an object to be examined and said light-receiving unit to individually exclusively receive the measurement light emitted from said light-projecting unit and transmitted through the object in a plurality of different second portions of the object;

the second step of causing said arithmetic control mechanism to calculate light densities of the measurement light obtained in the plurality of second portions on the basis of a numerical analysis method which approximates a predetermined light diffusion equation, when it is assumed that the object is divided into a plurality of fine segments as an aggregate model and all the plurality of segments have the same value as an absorption coefficient under conditions equivalent to the conditions by which the object is measured by using said light-projecting unit and said light-receiving unit;

the third step of causing said arithmetic control mechanism to calculate light densities of the measurement light obtained in the plurality of second portions on the basis of the numerical analysis method, when it is assumed that only one segment sequentially selected from the plurality of segments has a specific value as an absorption coefficient under the conditions equivalent to the conditions by which the object is measured by using said light-projecting unit and said light-receiving unit;

the fourth step of causing said arithmetic control mechanism to calculate, as influences of the plurality of segments, ratios of the light densities of the plurality of second portions calculated in the second step to the light densities of the second portions calculated in the third step, thereby obtaining an influence matrix corresponding to an arrangement of the plurality of segments;

the fifth step of causing said arithmetic control mechanism to calculate relative ratios of the light densities of the measurement light obtained in the plurality of second portions in the first step to the light densities in the plurality of second portions calculated in the second step, thereby obtaining a relative ratio matrix corresponding to arrangements of the pluralities of first and second portions; and the sixth step of causing said arithmetic control mechanism to perform a matrix calculation by using the influence matrix obtained in the fourth step and the relative ratio matrix obtained in the fifth step, thereby obtaining feature data of the plurality of segments in order to reconstruct a tomographic image of the object on the basis of a scattering absorption state of the measurement light entering the object.

14. A method according to claim 13, wherein the second to sixth steps comprise using as the numerical analysis method a difference method which solves the light diffusion equation by approximating the equation to a difference equation, and using as the segments volume elements arranged at equal intervals in the object on the basis of a predetermined coordinate system.

15. A method according to claim 13, wherein the second to sixth steps comprise using as the numerical analysis method a finite element method which solves the light diffusion equation by approximating the equation to a finite element equation, and using as the segments finite elements which are a finite number of elements freely separately arranged in the object.

16. A method according to claim 13, wherein the second to sixth steps comprise using as the numerical analysis method a finite volume method which solves the light diffusion equation by approximating the equation to a finite volume equation, and using as the segments finite volumes which are a finite number of volumes freely separately arranged in the object.

17. A method according to claim 13, wherein when it is assumed that each of the absorption coefficients of the plurality of segments is zero, the second step comprises calculating the light densities of the plurality of segments on the basis of the numerical analysis method.

18. A method according to claim 13, wherein the sixth step comprises obtaining a distribution of absorption coefficients in the object as the feature data of the plurality of segments.

19. A method according to claim 13, wherein the first step comprises causing said light-projecting unit to emit continuous light as the measurement light to be projected onto the object, and causing said light-receiving unit to continuously detect the exit measurement light from the object.

20. A method according to claim 13, wherein the first step comprises causing said light-projecting unit to emit pulse light as the measurement light to be projected onto the object, and causing said light-receiving unit to detect the exit measurement light from the object by a predetermined time-resolved measurement.

21. A method according to claim 13, wherein the first step comprises causing a light source included in said light-projecting unit to generate the measurement light, causing a plurality of optical fibers included in said light-projecting unit to project the measurement light emitted from said light source onto the object, and causing an optical switch which is included in said light-projecting unit and connects said light source and said plurality of optical fibers by using light branch paths to selectively open only one of a plurality of output terminals constituting said light branch paths.

22. A method according to claim 13, wherein the first step comprises causing a plurality of optical fibers included in said light-receiving unit to extract the measurement light from the object, causing a photoelectric conversion device included in said light-receiving unit to photoelectrically convert the incident measurement light from said plurality of optical fibers, and causing an optical switch which is included in said light-receiving unit and connects said plurality of optical fibers and said photoelectric conversion device by using light branch paths to selectively open only one of a plurality of input terminals constituting said light branch paths.

23. A method according to claim 13, wherein the first to sixth steps comprise causing a storage unit included in said arithmetic control mechanism to store various data detected by said light-receiving unit and various data calculated by an arithmetic unit included in said arithmetic control mechanism, and causing a controller included in said arithmetic control mechanism to sequentially control operations of said light-projecting unit, said light-receiving unit, and said arithmetic unit.

24. A method according to claim 13, further comprising the seventh step of causing a display to process input image data from said arithmetic control mechanism and to display a tomographic image of the object.

* * * * *